(Model.)

F. A. HELMECKE.
COTTON CHOPPER.

No. 245,492. Patented Aug. 9, 1881.

WITNESSES:
Chas. Nida
C. Sedgwick

INVENTOR:
F. A. Helmecke

BY
Munn & Co
ATTORNEYS.

N. PETERS. Photo-Lithographer. Washington, D. C.

UNITED STATES PATENT OFFICE.

FRIEDERICH A. HELMECKE, OF ROUND TOP, TEXAS.

COTTON-CHOPPER.

SPECIFICATION forming part of Letters Patent No. 245,492, dated August 9, 1881.

Application filed March 19, 1881. (Model.)

*To all whom it may concern:*

Be it known that I, FRIEDERICH A. HELMECKE, of Round Top, in the county of Fayette and State of Texas, have invented a new and useful Improvement in Cotton-Choppers, of which the following is a full, clear, and exact description.

My invention consists in a novel construction and arrangement of devices for raising and lowering the hoes and throwing them in and out of gear, as hereinafter more particularly described and set forth.

Figure 1:
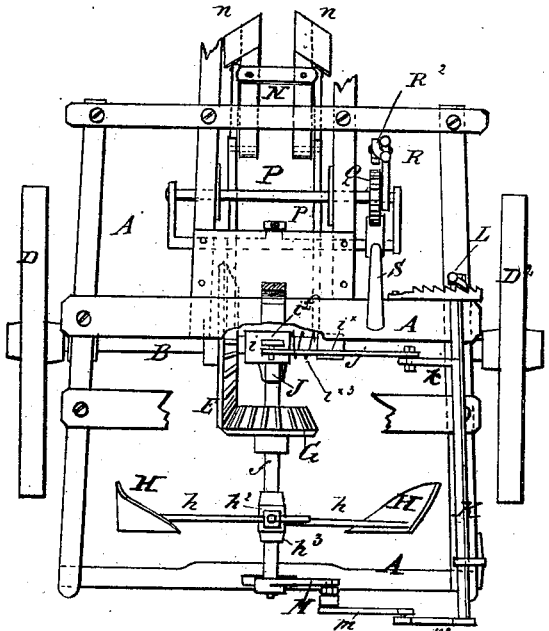
Figure 2:
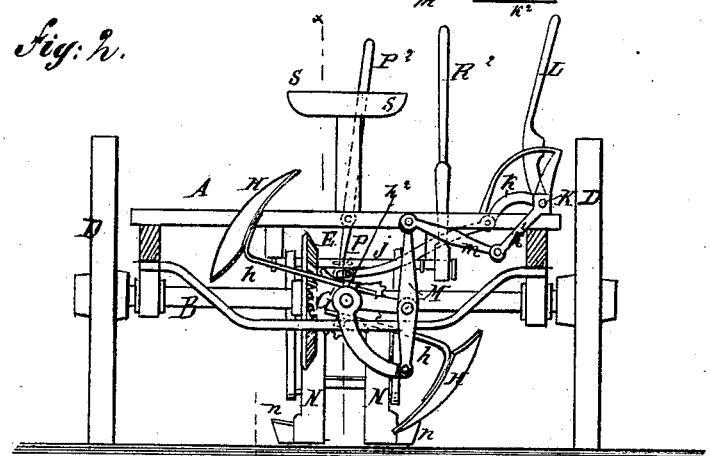
Figure 3:
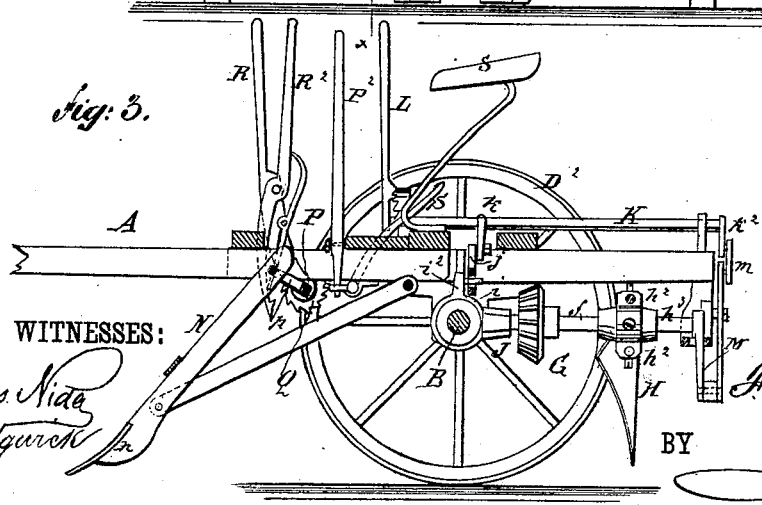

In the accompanying drawings, Figure 1 is a top view of a machine embodying my improvements. Fig. 2 is a rear view of the same. Fig. 3 is a longitudinal vertical section, taken in the line $x\ x$, Fig. 2.

Similar letters of reference indicate corresponding parts.

A represents the frame of the machine, in which is journaled the round axle B, carrying the wheels D $D^2$. The wheel $D^2$ is loose on the axle; but the wheel D is fast thereon, and its revolution gives motion to a bevel-wheel, E, carried by the axle near the center of its length. This wheel E meshes into a bevel-pinion, G, near the front end of a shaft, $f$, lying at right angles with the axle B, and having near its rear end the hoes H, which are carried by arms $h$, passing through perforated lugs $h^2$, formed upon a sleeve, $h^3$. Said sleeve is secured to and adjustable on said shaft by a set-screw, and said arms are adjustable in a similar manner in said lugs. The front end of the shaft $f$ has its bearing in the rear end of a thimble or ferrule, J, the front end of which carrries a collar, $i$, through which the round axle B passes. The collar $i$ has extending upward from it an arm, $i^2$, which engages with one end of a connecting-rod, $j$, the other end of which is pivoted to an arm, $k$, rigidly attached to a rock-shaft, K, journaled in bearings parallel with the shaft $f$, and provided at its front end with a lever-handle, L.

On the axle B is a rigid collar, $i^x$, between which and the collar $i$ is a spring, $i^{x3}$, the tendency of which is to keep the pinion G engaged with the bevel-wheel E.

The elbow-lever M carries in one arm the rear end of shaft $f$, while the other arm is connected by a link, $m$, with an arm, $k^2$, rigidly attached to the rear end of shaft K, said lever being fulcrumed on a rear cross-bar of frame.

When the lever-handle L is moved toward the seat $s$ the rod $j$, actuated by the arm $k$, pulls the collar $i$ outward, so as to disengage the pinion G from the wheel E. At the same time the rod $m$, actuated by the arm $k^2$, pulls outward on the long arm of the elbow-lever M, so as to elevate the short arm thereof, and with it the rear end of the shaft $f$, and thus raise the hoes H from the ground. When the lever-handle L is moved outward again the spring $i^{x3}$ throws the pinion G into gear with the wheel E, while the depression of the short arm of the elbow-lever M, and with it the rear end of the shaft $f$, lowers the hoes toward the ground again.

The scrapers $n$ are carried by standards N, the upper ends of which are pivoted to arms $p$, carried by a shaft, P, working in hangers depending from the frame A. To this shaft P, or to a similar shaft in rear thereof and connected with it, is attached the short arm of a lever, $P^2$, pivoted immediately in front of the seat $s$. By moving the lever $P^2$ alternately to the right and left, the scrapers are oscillated so as to cause them to travel in a zigzag course as the machine is drawn along.

To one end of the shaft P is rigidly attached a ratchet or spur wheel, Q, and pivoted on said shaft is a lever, R, carrying a hand-lever pawl, $R^2$. By engaging said pawl with said ratchet or spur wheel and moving the lever R backward the scraper-standards N are raised so as to lift the scrapers from the ground.

Immediately in rear of the lever R is pivoted a lever, S, the short arm of which is formed into a pawl for engagement with the ratchet or spur wheel Q, by which means the scraper-standards may be held at whatever position they may be raised by the lever R, as before described.

Having thus described my invention, I claim as new and desire to secure by Letters Patent—

In a cotton-chopper, the combination, with shaft $f$, of the thimble J, having the collar $i$, provided with arm $i^2$, the axle B, the rod $j$, and the rock-shaft K, having arms $k\ k^2$, the rod $m$, and lever M, as and for the purpose specified.

FRIEDERICH A. HELMECKE.

Witnesses:
 C. L. SCHULZE,
 W. GINZEL.